(12) United States Patent
Lin

(10) Patent No.: US 8,134,271 B2
(45) Date of Patent: Mar. 13, 2012

(54) ADAPTIVE WINDING SYSTEM AND CONTROL METHOD FOR ELECTRIC MACHINES

(76) Inventor: Panchien Lin, Chunglin (TW)

( * ) Notice: Subject to any disclaimer, the term of this patent is extended or adjusted under 35 U.S.C. 154(b) by 0 days.

(21) Appl. No.: 13/154,922

(22) Filed: Jun. 7, 2011

(65) Prior Publication Data

US 2011/0241592 A1   Oct. 6, 2011

Related U.S. Application Data

(62) Division of application No. 11/905,981, filed on Oct. 5, 2007, now Pat. No. 7,977,842.

(60) Provisional application No. 60/849,463, filed on Oct. 5, 2006.

(51) Int. Cl.
*H02K 1/00* (2006.01)

(52) U.S. Cl. .......................... 310/184; 310/179; 310/198

(58) Field of Classification Search .......... 310/179–198, 310/68 E
See application file for complete search history.

(56) References Cited

U.S. PATENT DOCUMENTS

| | | | |
|---|---|---|---|
| 5,221,880 A | 6/1993 | Bartholow et al. | |
| 6,020,711 A | 2/2000 | Rubertus et al. | |
| 6,064,172 A | 5/2000 | Kuznetsov | |
| 6,170,974 B1 * | 1/2001 | Hyypio | 716/136 |
| 6,252,325 B1 | 6/2001 | Nashiki | |
| 6,359,800 B1 * | 3/2002 | Liang et al. | 363/70 |
| 6,628,100 B1 * | 9/2003 | Stendahl et al. | 318/701 |
| 6,847,147 B2 | 1/2005 | Gladkov | |
| 6,853,107 B2 | 2/2005 | Pyntikov et al. | |
| 6,885,162 B2 * | 4/2005 | Stridsberg | 318/400.29 |
| 7,166,948 B2 * | 1/2007 | Petersen | 310/179 |
| 7,202,620 B2 * | 4/2007 | Petersen | 318/400.31 |
| 7,710,081 B2 * | 5/2010 | Saban et al. | 322/89 |

* cited by examiner

*Primary Examiner* — Thanh Lam

(74) *Attorney, Agent, or Firm* — Arent Fox LLP

(57) ABSTRACT

An adaptive winding configurations and control method is disclosed for the electromagnetic poles of electric machines, including motors and generators. Motors utilizing the inventive adaptive winding configuration and control method are able to dynamically adjust their operating characteristics to maintain a constant rated power over a large operating speed range with high efficiency. Generators employing the inventive adaptive winding configuration and control method are able to dynamically adjust their operating characteristics in response to a variable driving force to achieve maximum power conversion efficiency. These generators are also able to dynamically change their output voltage and current (thus charging speed) when charging batteries depending on the charged state of the battery, and on the expected duration of the input power.

5 Claims, 10 Drawing Sheets

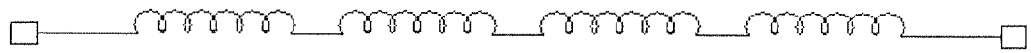
FIG. 1A ~ Prior Art
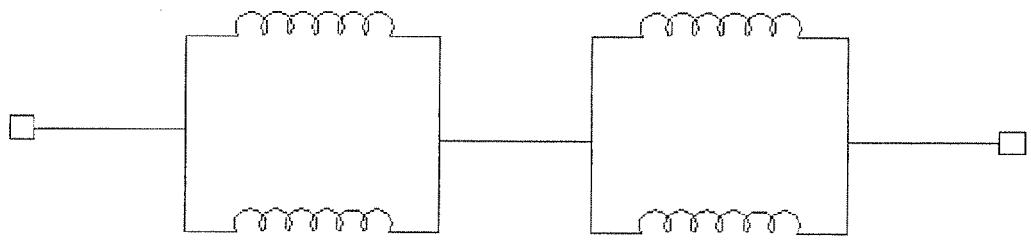
FIG. 1B ~ Prior Art
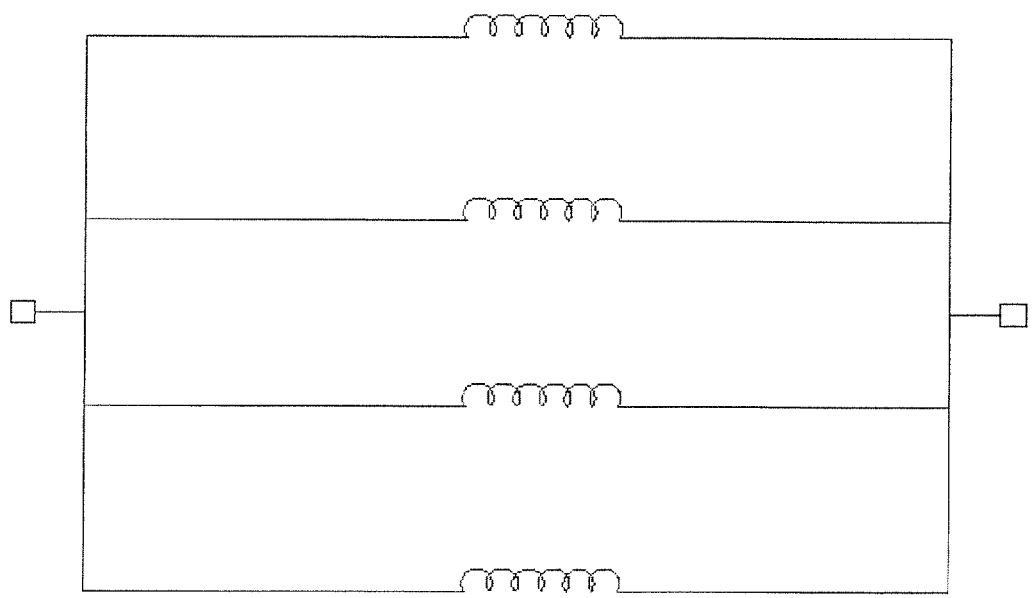
FIG. 1C ~ Prior Art

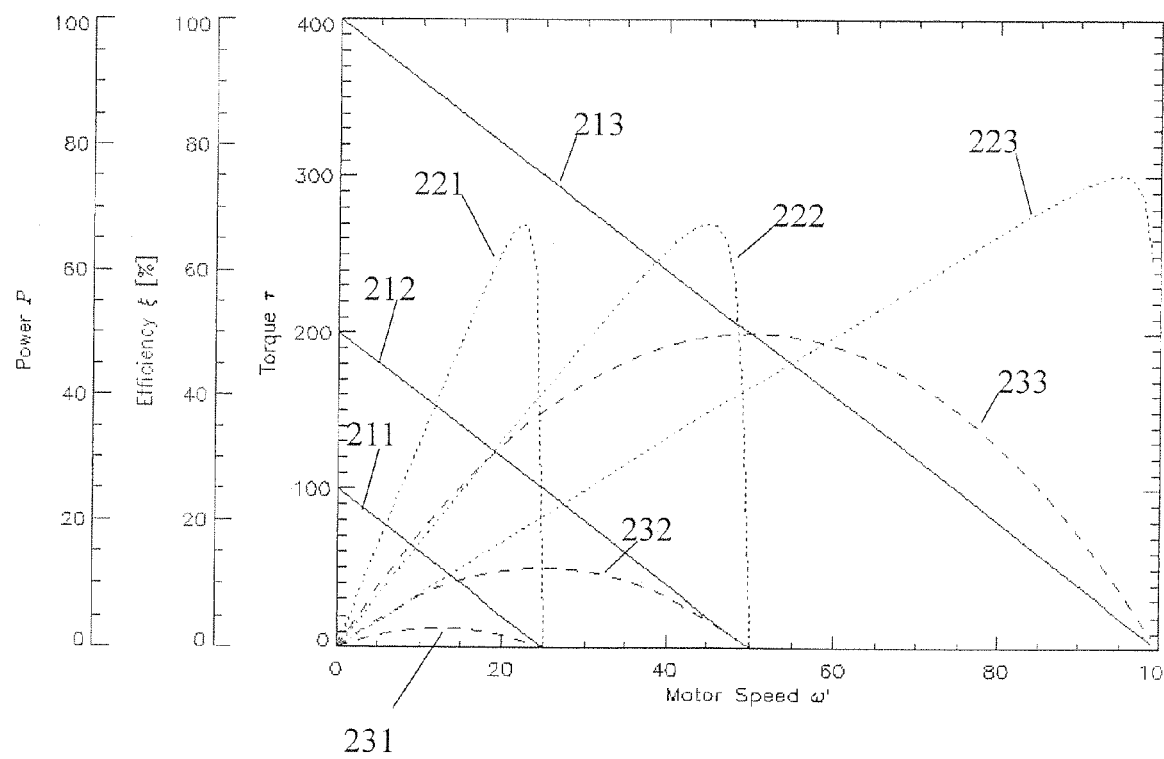
*FIG. 2 ~ Prior Art*

ADAPTIVE WINDING SYSTEM AND CONTROL METHOD FOR ELECTRIC MACHINES

CROSS-REFERENCE TO RELATED APPLICATIONS

This application is a Divisional of U.S. patent application Ser. No. 11/905,981, filed Oct. 5, 2007, which claims the benefit of priority from U.S. Provisional Patent Application Ser. No. 60/849,463, filed Oct. 5, 2006. The entire contents of which are incorporated herein by reference.

BACKGROUND

1. Field of the Invention

The present invention relates in general to electric machines and, in particular, to an adaptive winding system and the corresponding control method thereof for electric machines.

2. Description of the Related Art

Since their invention more than a century ago, electric motors and generators have become an indispensable part of human activities. They are found in almost every application in which controlled motion is required. Despite of their widespread use, electric motors so far have only played a very limited role as the primary mover in vehicular application, even though they do have higher efficiency than internal combustion engines. This is largely due to the deficiency of electric energy storage technologies. Currently, purely electricity-powered vehicles have very limited travel range per charge. The limited power density of current battery systems certainly is the primary reason for the limited travel range. Nevertheless, the lack of electric motors that are efficient over a broad speed range and loading conditions also contributed to the low performance of current electric vehicles. Although future successful implementation of electric motors for transportation purposes will depend critically on the development of advanced battery technology, development of new efficient electric motors and generator obviously will also play a vital role if electric vehicles are to gain widespread acceptance.

Among existing motor designs, permanent magnet (PM) motors are perhaps the most efficient due to the fact that no energy is required to energize the permanent magnets. However, this high efficiency operation can only be achieved in a narrow torque and speed range for conventional PM motors, although they can still be used over a wide torque and speed range at lower efficiency. The characteristics of electric motors and generators depend strongly on the magnetic field intensities of the reacting magnets and the inductances and resistance of the windings of the electromagnets. Therefore motors and generators can be optimized to operate in different operating conditions by adjustment of the magnetic field intensity of the magnets and the inductance and resistance of the windings.

Various methods have been proposed to allow for dynamic adjustment of the PM motors to achieve broader high-efficiency operating range. One obvious method for the adjustment of the reacting magnetic intensity of PM motors is by physical movement of the PM. However, the complexity and high cost of the mechanisms required to physically moving the PMs, and the increased risk of failure associated with these mechanisms make this option unfavorable. More recent methods proposed for field-weakening of PM motor usually involve using an auxiliary winding to cancel the magnetic field of the PM. However, these methods require additional energy to achieve field-weakening control, thus are not energy-efficient.

Another method that is commonly implemented to change the operating characteristics of electric machines is by reconfiguring the windings of the electromagnets in these machines. U.S. Pat. No. 6,847,147 utilizes windings with different wire gauge and number of turns that are energized and de-energized with variable voltages for operation at different speed range. In another U.S. Pat. No. 6,853,107 a BLDC motor with dynamically reconfigurable windings configurations shown in FIGS. 1A-1C is disclosed. However, close examination reveals that the rated power in these configurations is not maintained at a constant level. Rated power of the series configuration in FIGS. 1A and 1B would be restricted to only ¼ and ½ of the rated power of the parallel configuration in FIG. 1C, respectively. This is illustrated by the simulated motor characteristic curves of these three configurations shown in FIG. 2. The torque, efficiency and output power as functions of motor speed are shown respectively in FIG. 2 as solid, dotted and dashed lines respectively. In this figure, curves 211, 221 and 231 are, respectively, torque, efficiency and power curves for the winding configuration in FIG. 1A, curves 212, 222 and 232 are curves for the winding configuration in FIG. 1B, and 213, 223 and 233 are for the winding configuration in FIG. 1C.

In transportation applications, the operation of motors can be characterized broadly by two distinctive phases. The first phase, hereafter referred to as the accelerating phase, involves the acceleration of a heavy load (the vehicle and the load it carries) from stationary state to a desired speed. In this phase, the motors are required to deliver the power that is required to rapidly set the load in motion at the desired speed. This phase typically represents only a small fraction of the total operating time. However, because of the high power required to set the vehicle in motion, it is necessary to maintain the efficiency of the motor at high values through the entire acceleration process. In city traffic conditions with frequent stops, the efficiency of the acceleration phase is even more critical for the overall performance of the vehicles. Since virtually all the existing prime movers (internal combustion and electric motors) achieve high efficiency operation only within a small speed and torque range, this is typically achieved by the implementation of an additional gear or belt transmission device.

In the second phase, or the cruising phase, the motors are used to maintain the load speed in response to changing external loading conditions such as the changing slope of the road, or the changing wind drag due to the changes in wind or vehicle speed. In this phase, the required power is usually a fraction of the maximum rated power of the motor during acceleration. Nevertheless, the efficiency of the motors also need to be maintained at a very high value, since the vehicles may spend most of the operating time in this phase, for example, when traveling on highways, In cruising phase, the maintenance of high efficiency operation when large variation in the external loading condition occurs is typically achieved by the use of the mechanical transmission devices. To compensate small variations in the external loading, the power input to the primary movers can be regulated. In the case of internal combustion engines, constant speed is usually achieved through the throttle control of the fuel injection system. More recent advanced designs can regulate the output power of the engines through the control of the number of active cylinders. In situations when electric motors are used as the prime movers, Pulse Width Modulation (PWM) is a well-established method for regulating the speed of the motors.

The current energy crisis has also spurred renewed interested in environmentally friendly power generation methods that do not rely on the burning of fossil fuel or coals, such as solar and wind power generation. Wind power generation is challenging since it depends on an uncontrollable power source. Wind turbine generators designed for certain wind speed will not be able to operate when the wind speed drops below its designed value. Therefore, it is desirable to have generators that can be dynamically reconfigured to operate over a broad range of wind speed. In modern electric and hybrid vehicles, regenerative braking system has become a critical component of the vehicle to help extending the driving range. Reconfigurable, adaptive generators that can adjust their output current and voltage dynamically according to the charging state of the battery and the driving conditions are obviously very desirable.

SUMMARY OF THE INVENTION

It is therefore an object of this invention to provide an electric motor capable of operating at a wide range of output speed and torque while maintaining high efficiency.

It is another object of this invention to provide a motor to deliver constant power close to the maximum rated power of the motor over a broad speed and torque range, while maintaining high efficiencies.

It is another object of this invention to provide a motor to operate at very high efficiency over a broad speed range but with reduced constant power output.

It is yet another object of this invention to provide a generator that allows for dynamic reconfiguration of the winding for the generator to operate over a broad input power range and speed, and to allow for dynamic adjustment of the output voltage and current optimized for the loading conditions.

It is yet another object of this invention to provide a winding control method that enables a motor to deliver constant power close to the maximum rated power of the motor over a broad speed and torque range, while maintaining good efficiencies.

It is yet another object of this invention to provide a winding control method that enables a motor to operate at very high efficiency over a broad speed range but with reduced power output.

It is yet another object of this invention to provide a winding control method for the electromagnets of a generator that allows for dynamic reconfiguration of the generator winding allowing the generator to operate over a broad input power range, and to allow for dynamic adjustment of the output voltage and current optimized for the loading conditions.

In order to achieve the above and other objects, the present invention provides an electric machine with an adaptive winding network comprising a plurality of winding elements electrically connected to form a winding array, the winding array having one or more parallel winding units each having one or more series-connected winding elements; wherein the configuration of the winding array is dynamically adjustable in real time by means of power switches or relays allowing for the optimization of the performance of the electric machine according to the changing operating conditions.

The present invention further provides a real-time control method for the adaptive winding network of an electric machine to operate the electric machine as an electric motor to provide constant output power over a large speed and torque range with high efficiency, the adaptive winding network of the electric machine having a plurality of winding elements electrically connected forming a winding array to be energized by a power source, the winding array having one or more parallel winding units each having one or more series-connected winding elements; the control method comprises 1) configuring the winding array with a small number of parallel winding units and with a small number of winding elements connected in series in each of the parallel winding units to allow the electric machine to work at high speed and low torque condition with high efficiency; and 2) configuring the winding array with a large number of parallel winding units and with a large number of series-connected winding elements in each of the parallel winding units to allow the electric machine to work at low speed and high torque condition with high efficiency; and with the number N of winding elements no in each parallel winding unit and the number of parallel winding units M energized following the rule that N=M. The control method further comprises configuring the adaptive winding network to form a winding array with a very large number of parallel winding units but with small number of winding elements in each parallel winding unit to provide very large output torque at the full range of operating speed. When operating at high speed, a constant-speed mode of operation with high efficiency can be achieved by keeping the number of winding elements in each parallel winding units constant while adjusting the number of parallel winding units.

The present invention further provides a real-time control method for the adaptive winding network of an electric machine to operate the electric machine as an electric generator to allow the dynamic reconfiguration for the electric machine to operate over a wide input speed and torque range. The adaptive winding network of the electric machine having a plurality of winding elements electrically connected forming a winding array, the winding array having one or more parallel winding units each having one or more series-connected winding elements; the control method comprises 1) configuring the winding array with a small number of parallel winding units and with a small number of series-connected winding elements in each of the parallel winding units to allow the electric machine to work at high speed with low input torque condition; 2) configuring the winding array with a small number of parallel winding units and with a large number of series-connected winding elements in each of the parallel winding units to operate the electric machine in a high speed, high input torque condition; 3) configuring the winding array with a large number of parallel winding units and a small number of series-connected winding elements in each of the parallel winding units to allow the electric machine to work at low speed and high input torque condition, and 4) configuring the winding array with a vary large number of parallel winding units but with a very small number of series-connected winding elements in each parallel winding unit to allow the electric machine to work at very low speed and very high input torque condition.

The present invention further provides a real-time control method for the adaptive winding network of an electric machine to operate the electric machine as an electric generator to allow the dynamic reconfiguration for the electric machine to generate the a wide range of output currents and voltages at any given input power and speed condition. The adaptive winding network of the electric machine having a plurality of winding elements electrically connected forming a winding array, the winding array having one or more parallel winding units each having one or more series-connected winding elements; the control method comprises 1) configuring the winding array with a small number of parallel winding units and a small number of total series-connected winding elements in each of the parallel winding units to allow the electric machine to generate a low voltage and low current output; 2) configuring the winding array with a small number of total parallel winding units and with large number of winding elements in each parallel winding unit to allow the electric machine to generate a high voltage and low current output; 3) configuring the winding array with a large number of total parallel winding units with large number of winding elements in each parallel winding unit to allow the electric machine to generate a high voltage and high current output; and 4) configuring the winding array with a large number of total parallel winding units with a small number of winding elements in each parallel winding unit to allow the electric machine to generate a low voltage and very high current output.

BRIEF DESCRIPTION OF THE DRAWING

FIGS. 1A, 1B and 1C schematically outline a prior-art winding configuration for an electric motor.

FIG. 2 illustrates simulated motor characteristic curves for the three winding configurations shown in FIGS. 1A-1C.

DETAILED DESCRIPTION OF THE PREFERRED EMBODIMENTS

Figure 3A:
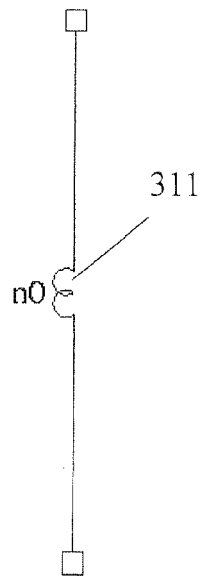
FIGS. 3A-3D illustrates configurations of windings for motor that has four discrete operating speed ranges with constant rated power and high efficiency.
Figure 3B:
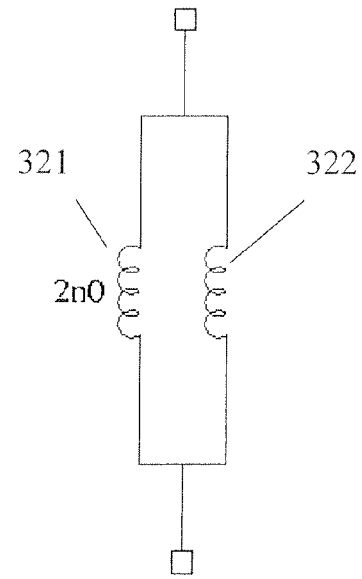
Figure 3C:
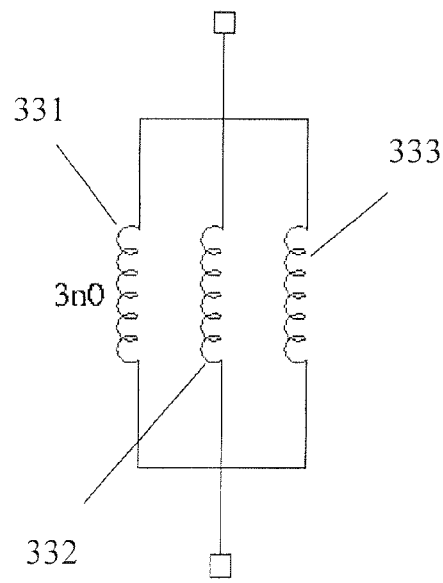
Figure 3D:
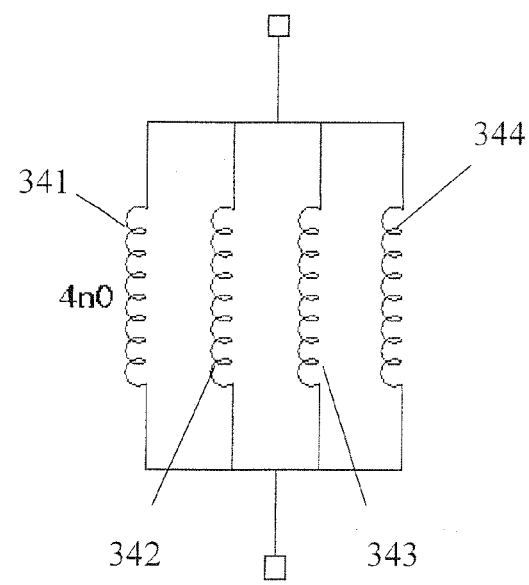

Objects of the present invention are achievable by an adaptive winding system (AWS), or, an adaptive network of conductor windings, having a number of windings elements that can be electrically connected to form an N×M winding array that is then connected to the power supply. Utilization of uniform winding elements simplifies the design calculation, although they do not need to be identical. In an ideal situation with uniform winding elements, N should be equal to M to maintain the rated power of the motors at each configuration. When implemented in the armature of brush DC motors, or, equivalently in the stator of permanent magnet brushless DC (PM BLDC) motors, an AWS can be configured to utilize only a small number of winding elements to allow the motor to work at high speed, low torque condition with high efficiency. The AWS can also be configured to form a large N×N winding array connected to the power supply for low speed high torque operation.

FIGS. 3A-3D show four winding configurations for the electromagnet poles of the stator of PM BLDC motors, or the armature of brush PM DC motors. FIGS. 3A-3D illustrates configurations of windings for motor that has four discrete operating speed ranges with constant rated power and high efficiency. The numbers of current loops in each winding are set according to the constant-power condition of EQS. 7 and 8 that will be described in the following paragraphs. Configuration 1 of FIG. 3A has a single winding element with no current loops with uniform cross-section area. Configuration 2 (3, and 4) in FIGS. 3B (3C and 3D) is constructed with 2 (3, and 4) parallel winding units 321 and 322 connected in parallel, with each parallel winding unit constructed by connecting 2 (3, and 4) winding elements in series, as is illustrated in the drawing, for example, by eight current loops in winding unit 341, four times the double loops in unit 311.

Figure 4:
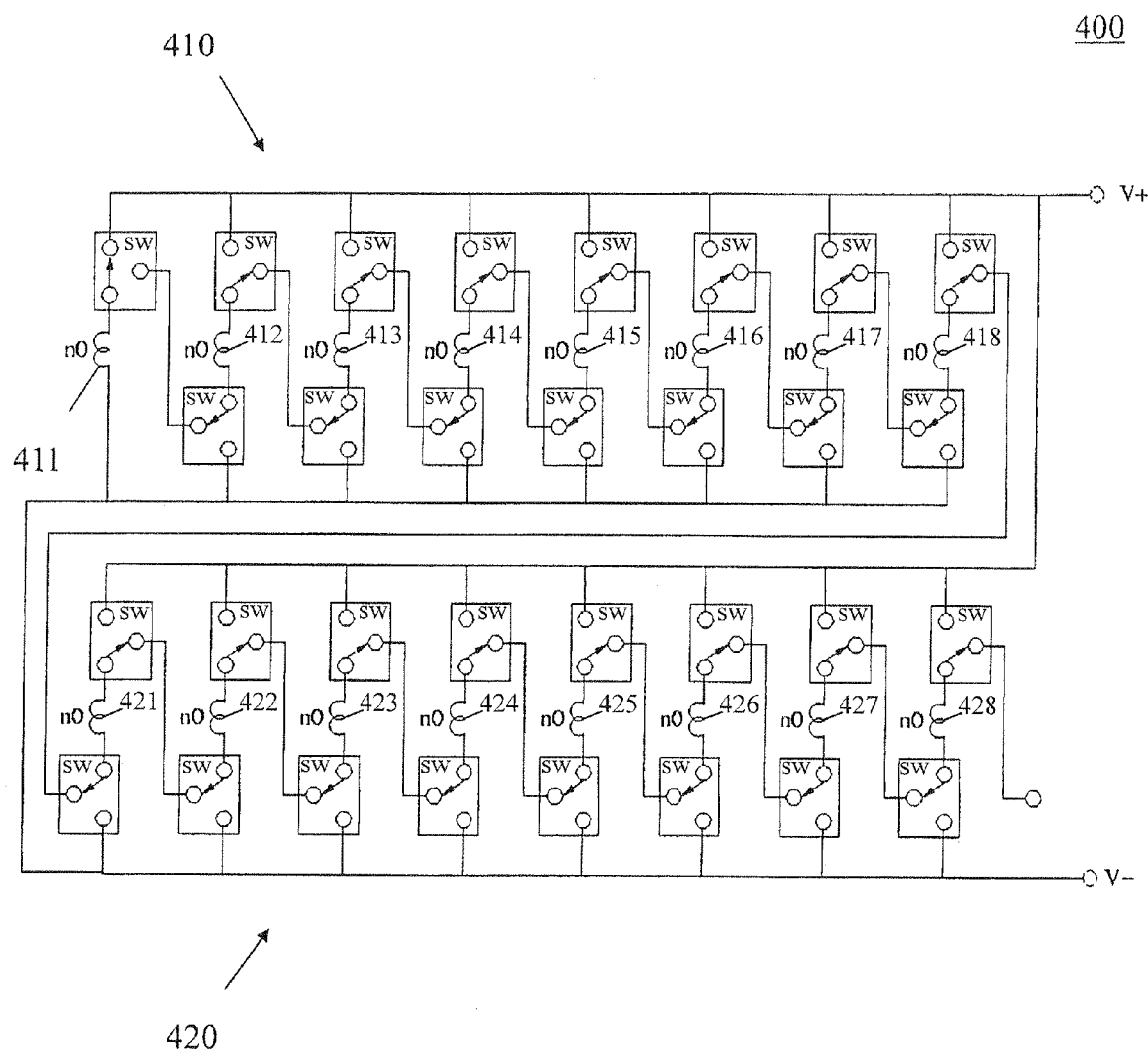
FIG. 4 schematically outlines a flexible 16-winding-element adaptive winding system that can be used to control a PM BLDC motor for constant-power over four speed ranges. A 1×1 winding array is shown.

FIG. 4 shows a 16-winding-element AWS circuit 400 that can be reconfigured dynamically to form the four winding configurations in FIGS. 3A-3D. As shown in FIG. 4, the AWS circuit 400 may include winding elements 411-418 and 421-428 and switches SW. The AWS circuit 400 can be used to control a PM BLDC motor for constant-power over four speed ranges. The winding elements 411-418 and 421-428 may be reconfigured into one or more series-connected winding elements via the switches SW to form one or more winding units, such as units 311, 321, 322, 331, 332, 333, 341, 342, 343 and 344 shown in FIG. 3. In this example, only one winding unit 411 is shown energized for high-speed operation.

Figure 5A:
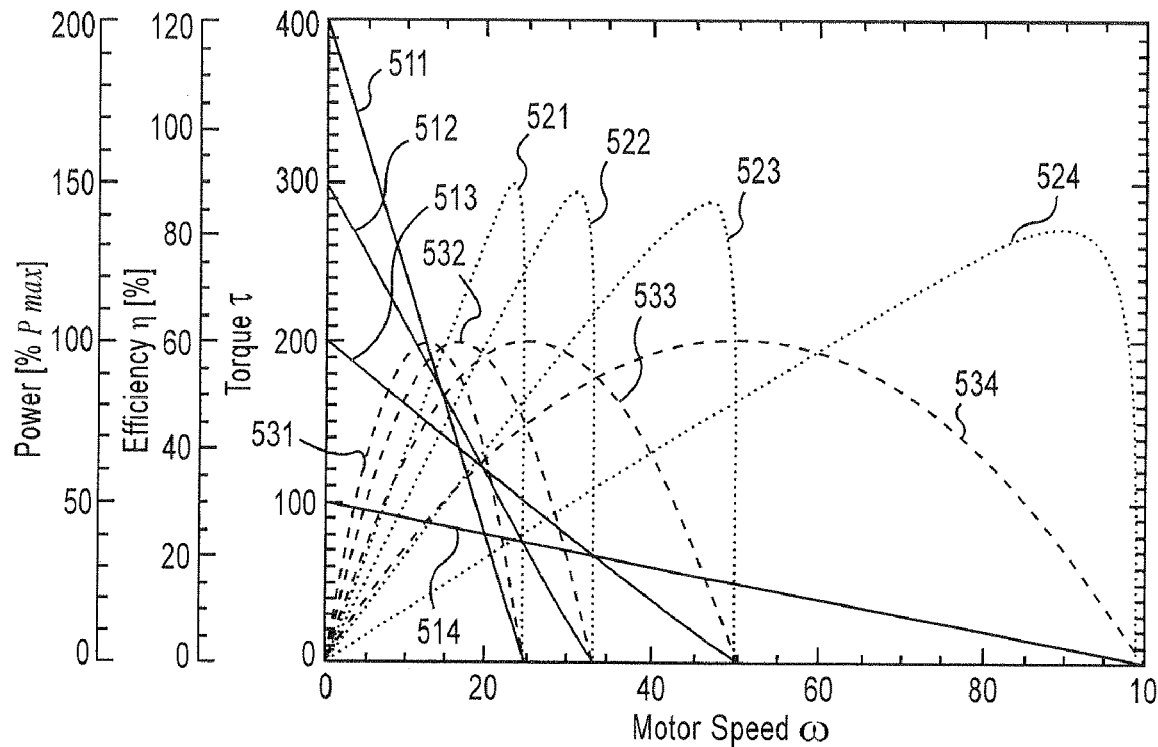
FIG. 5A illustrates the characteristic curves of motors with 1×1, 2×2, 3×3 and 4×4 parallel winding arrays respectively.
Figure 5B:
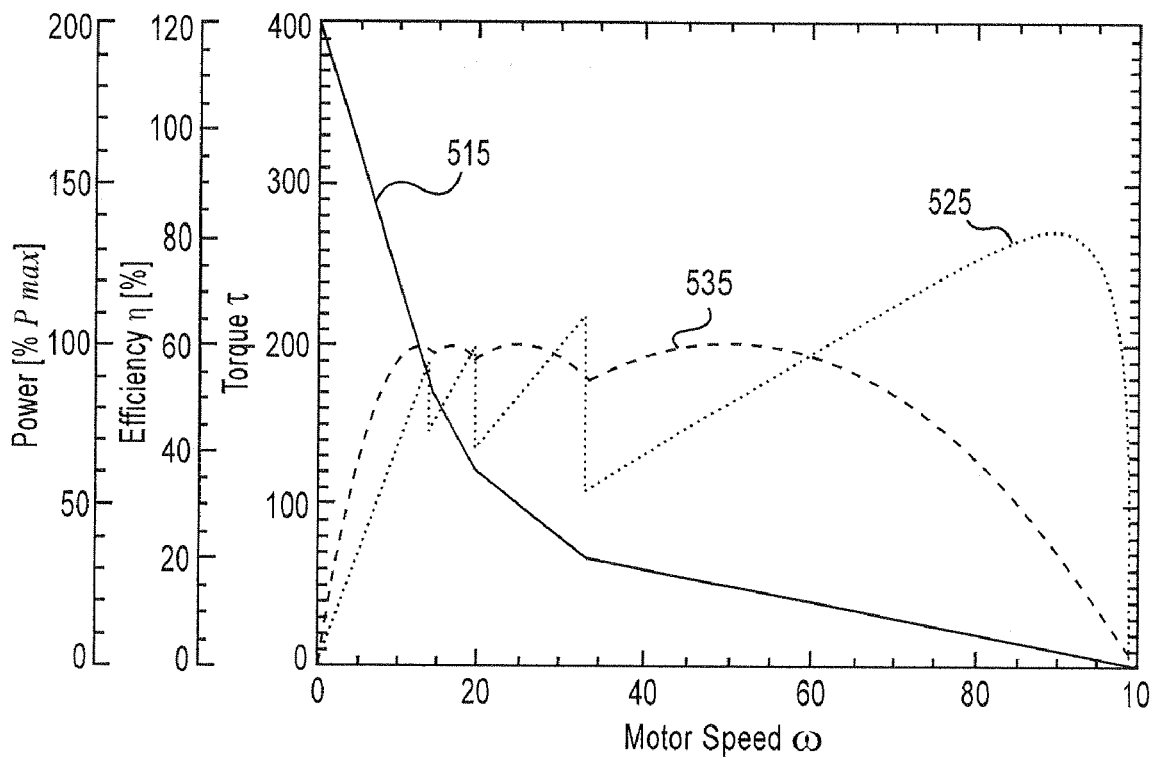
FIG. 5B illustrates combined AWS motor characteristic curves switching from a 1×1 to a 4×4 configuration when operating at maximum power mode.

FIGS. 5A and 5B show the simulated characteristic curves of motor speed, efficiency, and output power of these configurations as functions of the motor speed. FIG. 5A illustrates the characteristic curves of motors with 1×1, 2×2, 3×3 and 4×4 parallel winding arrays respectively. The solid 511, 512, 513, 514, dotted 521, 522, 523, 524, and dashed lines 531, 532, 533, 534 are the τ-ω (torque), η-ω (efficiency), and P-ω (power) curves, respectively. FIG. 5B illustrates combined AWS motor torque, power and efficiency characteristic curves 515, 525 and 535 switching from a 1×1 to a 4×4 configuration when operating at maximum power mode.

Figure 6:
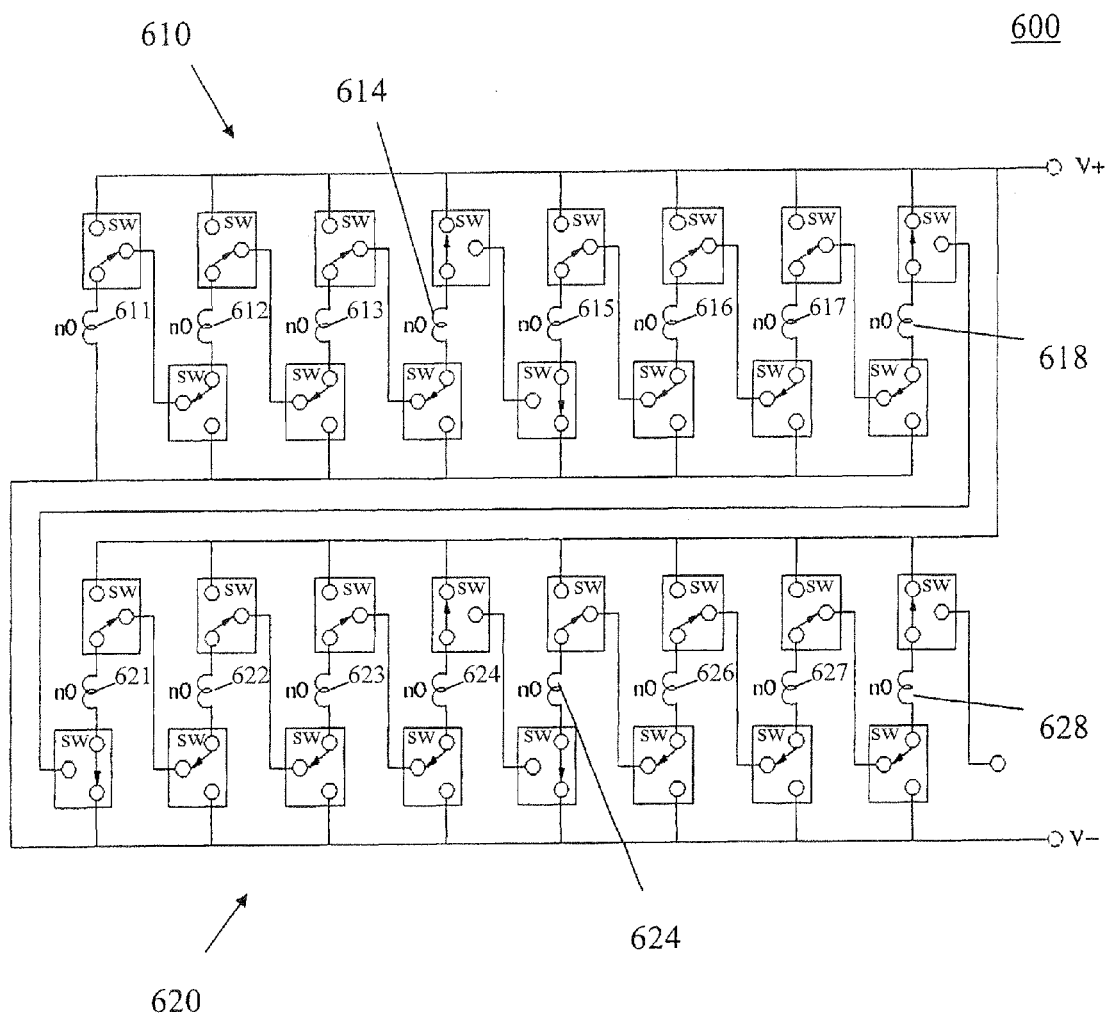
FIG. 6 schematically outlines the flexible adaptive winding system of FIG. 4 in a 4×4 configuration for low-speed, high-torque operation.

FIG. 6 schematically outlines a flexible adaptive winding system 600 in a 4×4 configuration for low-speed, high-torque operation. As shown in FIG. 6, the AWS 600 may include winding elements 611-618 and 621-628 and switches SW. The winding elements 611-618 and 621-628 may be reconfigured into one or more series-connected winding elements via the switches SW to form one or more winding units, such as units 311, 321, 322, 331, 332, 333, 341, 342, 343 and 344 shown in FIG. 3. In the example of the AWS 600, only windings 614 and 618 among the eight winding elements of set 610 and windings 624 and 628 in set 620 are energized. However, this can only be operated at speed below its no-load-speed. As motor speed increases, windings can be switched to the 3×3 configuration, allowing the motor to operate at speeds higher than the no-load-speed of the 4×4 configuration, while maintaining a constant rated power. As the motor speed increases further, the adaptive winding array is switched progressively to the 2×2, then the 1×1 configuration. Note that the adaptive winding system can be wound entirely around a single electromagnet pole of the motor, or, for motors with multiple magnetic poles per phase, each of the winding systems can be distributed uniformly over all the magnetic poles of a phase.

The operating speed of the motor within each configuration is selected by the motor controller. For operation requiring maximum power, the operating speed can be set at the maximum power speed. In this operating mode, the motor efficiency may be maintained near 50%—maximum efficiency for electric motor at peak power output. An AWS motors can also be operated in the constant power mode with higher efficiency but at lower power output. When these motors are operating in conditions with reduced power requirement, for example, after the vehicle has attained cruising speed and the motors are only required to maintain or make small adjustment to the speed in traffic, the controller selects the operating speed in each configuration that corresponds to higher efficiency with lower power output. In the case that the power requirement drops below the output power at the maximum efficiency point of that configuration, PWM can be employed to further reduce the output power. The combined torque-speed characteristics of motors operating in this constant-power mode, such as the r-co curve 515 in FIG. 5B, clearly resembles that of an ideal engine consists of a constant speed and power prime mover equipped with a continuous variable transmission.

Note that in addition to the constant power mode as described by the constant power condition of M=N, the AWS of the motor can also be configured with a large number of parallel winding units but with only a small number of series-connected winding elements in each of the parallel winding units to operate the motor in a high output torque (or equivalently, high output power) mode. This mode has very high output torque but low efficiency at low speed. Nevertheless, it can be utilized when extra torque is required to accelerate a heavy load from zero speed, or when high initial acceleration is desired. The optimal operating condition for this mode is, however, at very high speed where its efficiency is high. The high efficiency and output torque provided by these configurations are best suited for operating conditions requiring high acceleration or when the external loading is high at high operating speed.

In addition to application to motors, the adaptive winding system can also be implemented in the stator magnetic poles of permanent magnetic brushless generators to facilitate the operation of generators over a broad input power and speed range while at the same time also provides flexible output voltage and current. For example, wind turbine generators used for wind power generation encounter constantly varying wind speeds. The force required to drive the generator increases with the number of unit windings connected in the AWS, regardless of their configurations (in parallel or in series). However, different configuration with the same number of unit windings determines the output voltage and current. Thus, an AWS generator can be configured to utilize only a small number of unit windings per phase for low wind speed operation. If N unit windings are used, it can be configured to a single parallel winding unit with N unit windings connected in series to provide a high-voltage, low-current output. Or, it can be configured to have N parallel winding units each with a single unit winding for low-voltage, high-current output. Obviously, many different combinations of output voltage and current can be achieved with such an adaptive winding system, allowing for dynamic adjustment in response to the ever changing input condition.

Figure 7:
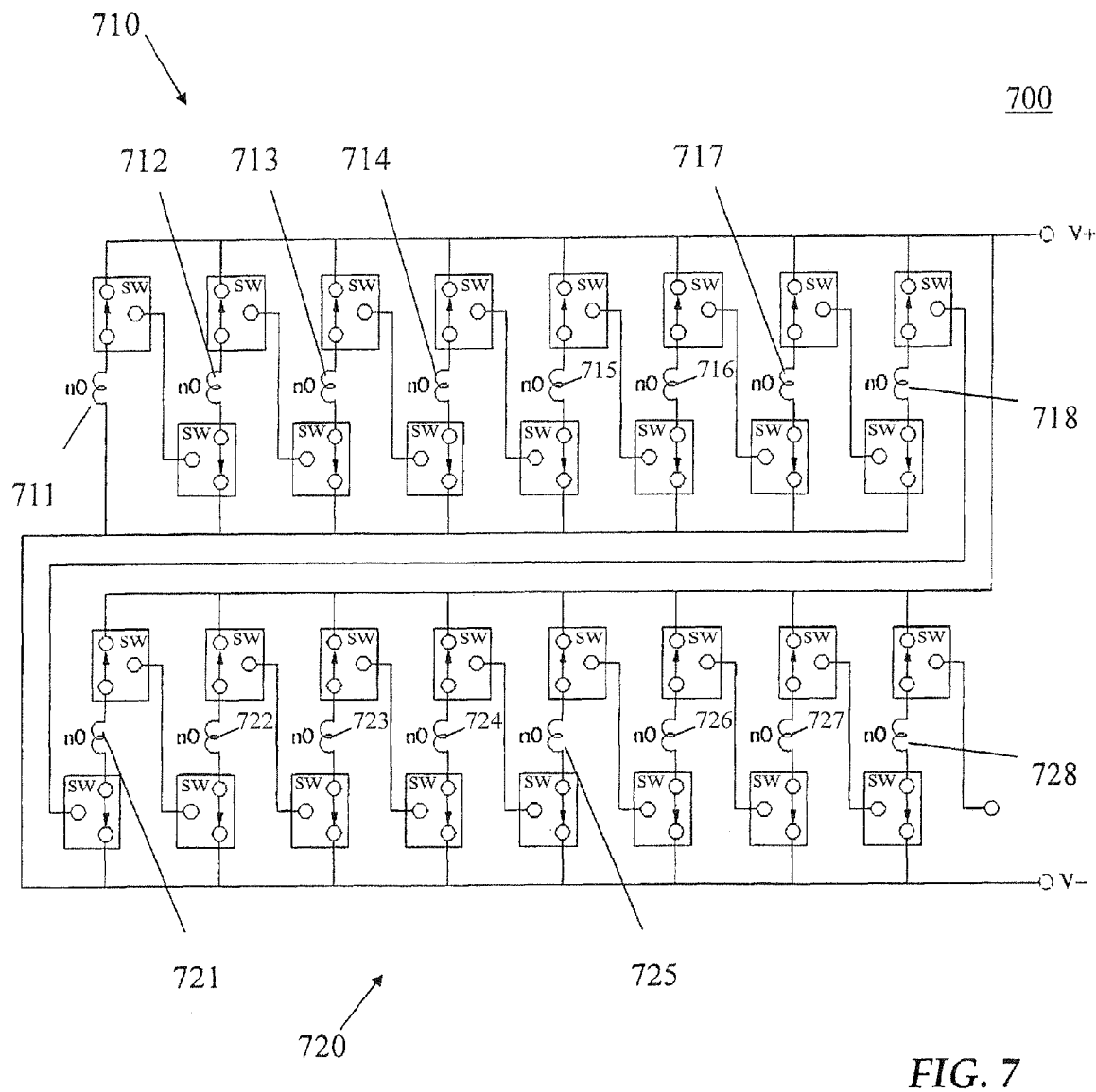
FIG. 7 schematically outlines the flexible adaptive winding system of FIG. 4 in a 1×16 configuration for use in a generator to provide low-voltage high-current output.

For regenerative braking applications, an AWS can initially be configured to have a large number of parallel windings, each with only one winding element (1×N), when the brake is applied at high speed to provide high braking torque. The circuit of FIG. 7 schematically outlines a flexible adaptive winding system 700 in a 1×16 configuration for use in a generator to provide low-voltage high-current output. As shown in FIG. 7, the AWS 700 may include winding elements 711-718 and 721-728 and switches SW. The winding elements 711-718 and 721-728 may be reconfigured into one or more series-connected winding elements via the switches SW to form one or more winding units, such as units 311, 321, 322, 331, 332, 333, 341, 342, 343 and 344 shown in FIG. 3. In the example of the AWS 700, the 1×16 configuration is achieved by energizing all winding elements 711 to 718 in set 710 and elements 721 to 728 in set 720.

As the vehicle speed decreases, the number of parallel windings energized can be decreased progressively to provide a smooth stop. Or, in an emergency braking situation, the AWS can have all its unit windings remain connected in parallel to provide maximum braking power. Furthermore, regardless of the total number of unit windings that are engaged for regenerative braking, they can be configured for different charging conditions to optimize the driving range and battery life. If the battery is still sufficiently charged, the generator can be configured to provide a charging voltage comparable to the rated voltage of the battery, but with low current to avoid overcharging the battery, which can cause reduced battery life. If the battery is substantially depleted, the AWS can be configured to have all the active unit windings connected in parallel to provide maximum charging current and efficiency to charge the battery rapidly, thus extending the driving range of the vehicle. Obviously, these vast varieties of winding configurations can be accommodated by the flexible AWS 400 shown in FIG. 4.

To facilitate clear description of this invention, the formulae governing electric machines derived from simplified electric machine models that are relevant to this invention are given first. The formulae that govern torque as a function of speed for a motor with single winding geometry, or alternatively, speed as a function of torque, are given by $$\tau = \tau_0 - \alpha\omega, \quad (1)$$

$$\omega = \omega_0 - \beta\tau, \quad (2)$$

with $$\tau_0 \equiv \frac{\mu n \phi V B}{R}, \quad (3)$$

$$\omega_0 \equiv \frac{V}{n \phi B}, \quad (4)$$

$$\alpha \equiv \frac{\mu n^2 \phi B^2}{R}, \quad (5)$$

$$\beta \equiv \frac{1}{\alpha}. \quad (6)$$

The definitions of the variables are:
  $\tau_0$: motor stall torque,
  $\omega_0$: motor no-load speed,
  $\alpha$: slope of the motor r-w function,
  $\mu$: magnetic permeability of the ferromagnetic iron of the magnetic poles,
  $\phi$: cross-sectional area of winding current loops (or coils),
  n: number of current loop in the winding element,
  V: source voltage from constant voltage power supply,
  B: magnetic field flux intensity provided by stator permanent magnet,
  R: resistance of the winding.

According to EQ. 3, for motors with a fixed winding configuration, the maximum torque the motors can deliver, or the stall torque $\tau_0$, is determined by the supply voltage V, the resistance of the windings R, and the number n of and the cross-sectional area $\phi$ of the current loops (or coils) of the windings. Also, increase of the supply voltage and number of current loops in the windings increases the stall torque, while increasing the resistance of the windings decrease stall torque. Therefore, simply increasing the number of current loops in the windings does not change the stall torque of the motors, because it also increases the resistance of the windings. In applications in which battery, which is a constant voltage power source, is the primary power source, it is not efficient to change the voltage applied to the motor windings. A modern motor is usually controlled by a Pulse-Width Modulation controller, in which a fixed voltage is applied to the motor, and the torque and output power are controlled by the duty cycle of the driving voltage applied to the motor. Although PWM control scheme eliminates the energy loss in the power delivering system to the motors, it does not change the efficiency characteristics of the motors. Thus, it does not extend the high-efficiency operating range of the motor.

Although increasing the number of current loops in the windings of motor does not change the stall torque, it does affect the no-load-speed of the motor. An increase in the number of current loops in the winding increases the amplitude of the back EMF. Thus the electric current flowing in the windings decreases more rapidly as a function of the motor speed. This results in the decrease of the no-load-speed, and suppresses the power the motors can deliver. This effect can be seen in EQ. 4.

The most effective method to increase motor stall torque is to increase the number of magnetic poles, or equivalently, increase the number of windings per magnetic poles. However, simply increasing the number of magnetic poles with identical winding configuration, or adding parallel windings with the same number of current loops and cross-sectional area (and with the same gauge wire) of each magnetic poles does not change the no-load-speed of the motors, since identical parallel windings yield identical voltage constant, which determine the speed when the back EMF cancels the applied voltage.

If the rated power of a motor is to be maintained at a constant level when changing the motor characteristics, it is then necessary to change the motor stall torque and no-load-speed simultaneously in a consistent manner. Consider a motor that is originally operating in a configuration with a no-load-speed of $\omega_0$, and a stall torque of $\tau_0$. If in a new configuration the stall torque is increase by some scaling factor A, then the no-load-speed needs to be decreased by the same factor in order to maintain a constant rated power for the new operating configuration. That is, $$\tau_0 \to A\tau_0, \tag{7}$$

$$\omega_0 \to \frac{\omega_0}{A}. \tag{8}$$

Refer to these conditions as the constant power conditions. Several methods can be employed to change the motor constants that satisfy EQS. 7 and 8 while maintaining the rated power of the motors at a constant level. For example, changing the field intensity of the stator magnet automatically satisfy the constant power conditions. This is the basis of the well-known field-weakening method. Constant power condition can also be satisfied by using windings built with different wire gauges and number of current loops.

In this invention, a method is employed that manipulates the winding configuration of the motor to achieve the invention stated goals. In particular, stall torque is controlled by the number of the parallel winding sections that are energized. When multiple windings (with identical construction and differ only in the number of coil turns) are connected in parallel, stall torque of the motor depends solely on the number of parallel winding sections. Each parallel winding section will contribute to different amplitude (both positive and negative) of torque depending on the geometry of the windings and the motor speed. The no-load-speed is control by both N and the total number of winding elements (or coil turns) used in all the active parallel windings. The characteristics equations between total torque and speed of a motor with N parallel windings energized are governed by $$\tau = N\tau_0 - \alpha M\omega, \tag{9}$$

$$\omega = \frac{N}{M}\omega_0 - \frac{\beta}{M}\tau, \tag{10}$$

$$\tau_N = N\tau_0, \tag{11}$$

$$\omega_N = \frac{N}{M}\omega_0, \tag{12}$$

with $$M \equiv \sum_{i=1}^{N} N_i. \tag{13}$$

The new variables are $\tau_N$: stall torque for motors with N parallel windings, (14)

$\omega_N$: no-load speed for motors with N parallel windings, (15)

$N_i$: number of unit current loops in the $i^{th}$ parallel winding, (16)

M: total number of winding elements energized. (17)

Thus, for motors equipped with N parallel windings that can be energized and de-energized independently, a constant rated power can be maintained for each setting as long as the no-load-speed $\omega_N$ and stall torque $\tau_N$ are controlled according to the constant power conditions of EQS. 7 and 8. Therefore, the additional constant power condition for motors with N parallel windings is $$\sum_{i=1}^{N} N_i = N^2. \tag{18}$$

The no-load-speed and stall torque of motors with N parallel windings and a total of $N^2$ identical winding elements are thus given by $$\tau_N = N\tau_0, \tag{19}$$

$$\omega_N = \frac{\omega_0}{N}. \tag{20}$$

Obviously, there are many possible configurations to create a winding topology with a total of N2 unit windings distributed over N parallel winding sections. For example, an AWS with four parallel winding sections, with 1, 3, 5, and 7 unit windings can be used to provide constant rated power from a high to low speed operation if winding 1, 2 (with 3 unit windings), 3 (with 5 unit windings) and 4 (with 7 unit windings) are energized successively. However, the efficiency of these configurations is not optimized. This is because that if multiple windings with different voltage constant and no-load-speed are engaged in parallel simultaneously, then, when the operating speed exceeds the no-load-speed of one of the winding, that winding becomes a generator, thus diverting the power generated from the other windings to the mechanical output of the motor. Thus, it is essential to use parallel windings with identical voltage constant to achieve high motor efficiency. This is easily achieved by using N winding elements in each parallel winding when N parallel windings engaged. That is, with $N_i = N$, constant power condition in EQ. 18 is automatically satisfied:

$$\sum_{i=1}^{N} N_i = \sum_{i=1}^{N} N = N^2. \tag{21}$$

Figure 8A:
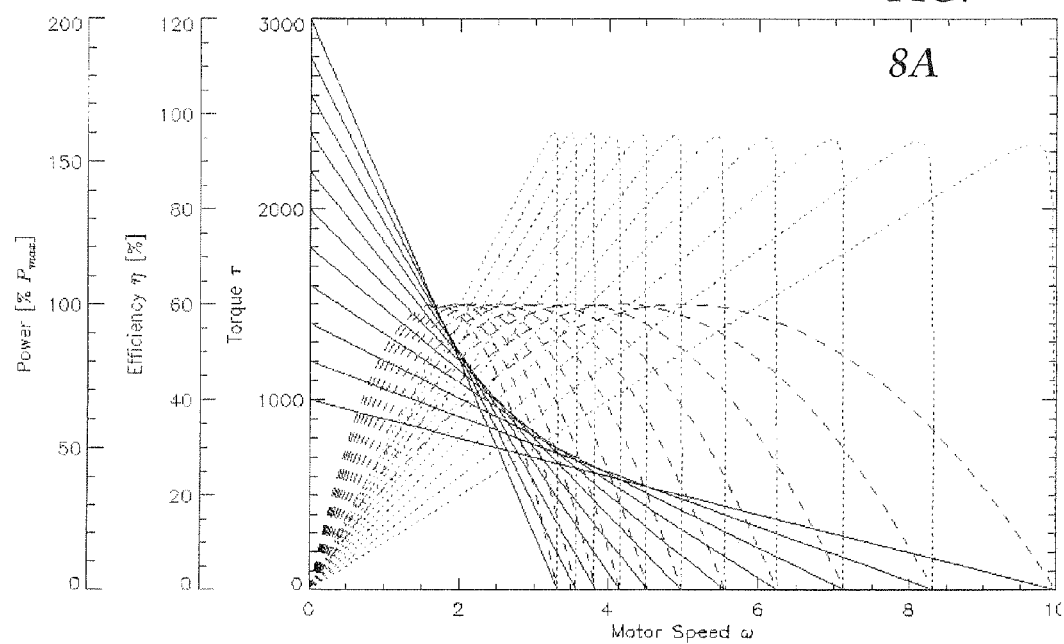
FIG. 8A illustrates characteristic curves of an AWS motor with a 10×10 base configuration, switching from a 10×10 to a 20×20 configuration.
Figure 8B:
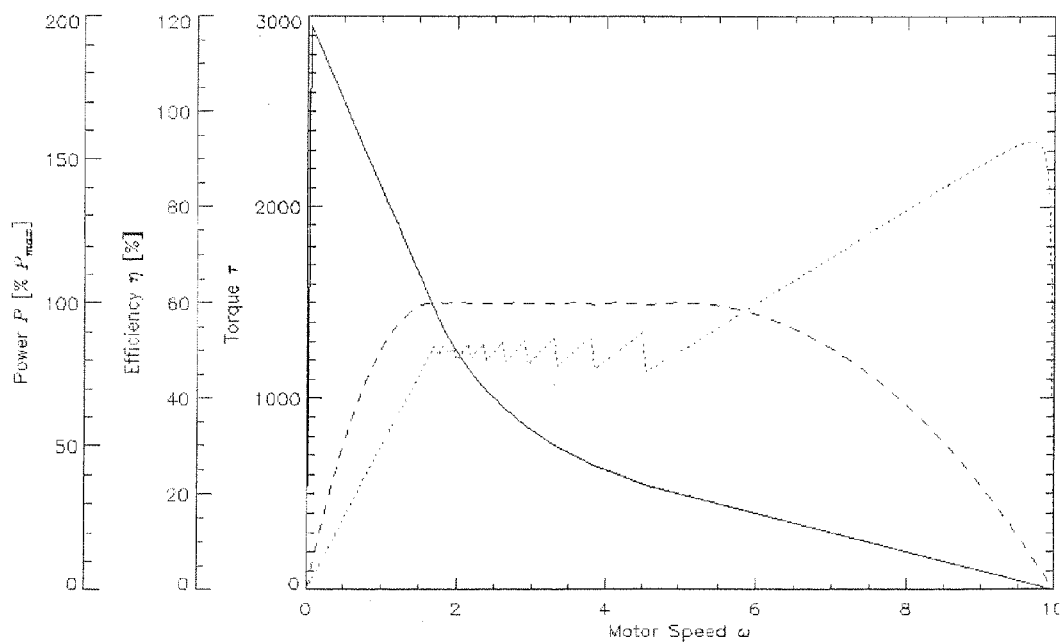
FIG. 8B illustrates combined AWS motor characteristic curves when operating at maximum power mode.
Figure 10:
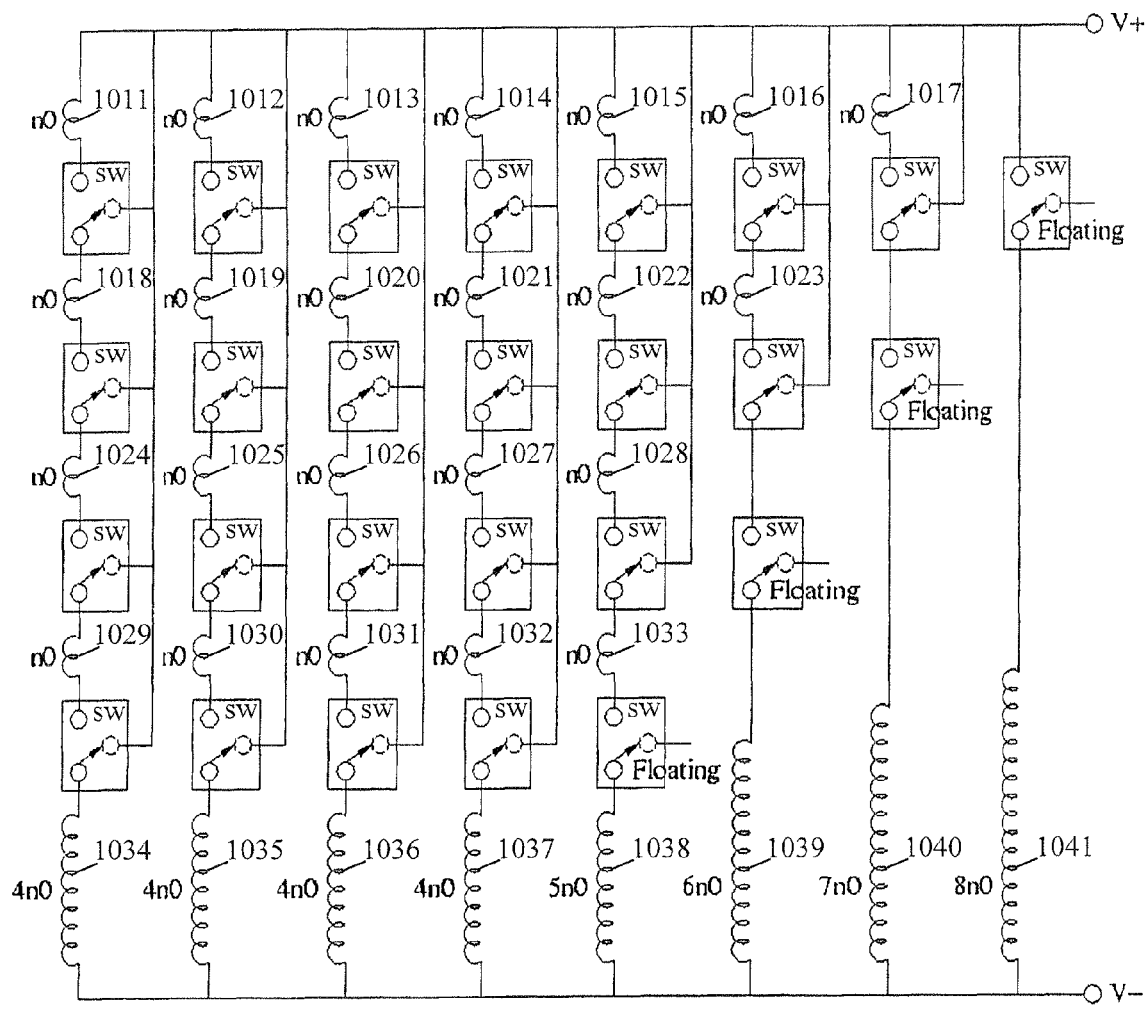
FIG. 10 schematically outlines a 4×4 to an 8×8 AWS with reduced number of power switches.

The simple AWS winding configurations with four operating speed ranges shown in FIGS. 3A-3D clearly demonstrate how the constant power winding configurations can be implemented. However, FIGS. 5A and 5B also show that due to the discrete nature of the winding number adjustments, the output torque and power, as well as the efficiency will have large variations when switching from one winding configuration to another. Nevertheless, amplitude of these variations can be minimized by the use of larger number of winding elements and parallel windings. FIGS. 8A and 8B show the characteristic curves of an AWS motor with a 10×10 (M×N, or number of parallel winding units×number of winding elements in each parallel winding unit) base configuration as the winding configurations switches from 10×10 to 11×11 to 20×20 if the motor is set to operate at the maximum power speed. FIG. 8A illustrates characteristic curves of an AWS motor with a 10×10 base configuration, switching from 10×10 configuration to 20×20 and FIG. 8B illustrates combined AWS motor characteristic curves when operating at maximum power mode. Obviously by making only small increments of N with respect to the base parallel winding number, the jitters in the motor characteristic curves can be reduced. The configuration of such an AWS 1000 with reduced number of power switches is shown in FIG. 10. FIG. 10 schematically outlines a 4×4 to 8×8 AWS 1000 with reduced number of power switches. As shown in FIG. 10, the AWS 1000 may include winding elements 1011-1041 and switches SW. Each of the winding elements 1011-1033 includes one current loop n0, and each of the winding elements 1034-1041 includes a plurality of current loops n0. For example, each of the winding elements 1034-1037 includes four current loops 4n0, winding element 1038 includes five current loops 5n0, winding element 1039 includes six current loops 6n0, winding element 1040 includes seven current loops 7n0, and winding element 1041 includes eight current loops 8n0. The winding elements 1011-1041 may be reconfigured into one or more series-connected winding elements via the switches SW to form one or more winding units. An advantage of the AWS 1000 is that only 26 switches are needed, instead of 32 using the AWS 400 shown in FIG. 4.

Figure 9A:
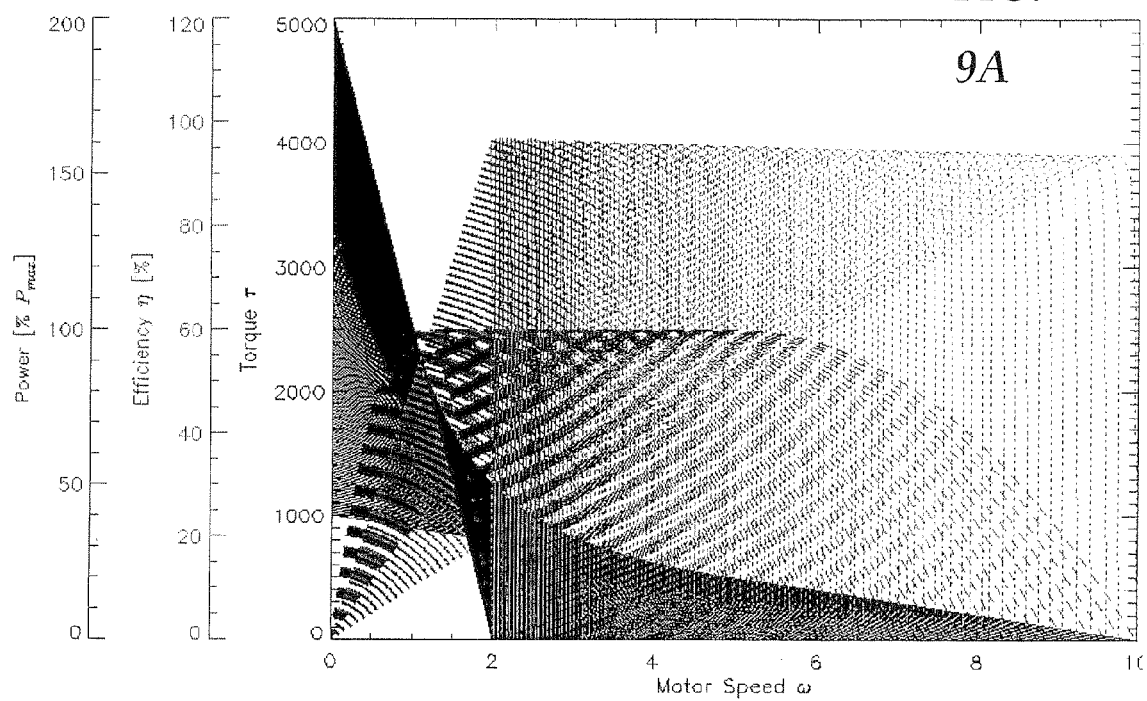
FIGS. 9A and 9B illustrate AWS motor characteristic curves switching from 100% to 75%, 50% and 25% power output.
Figure 9B:
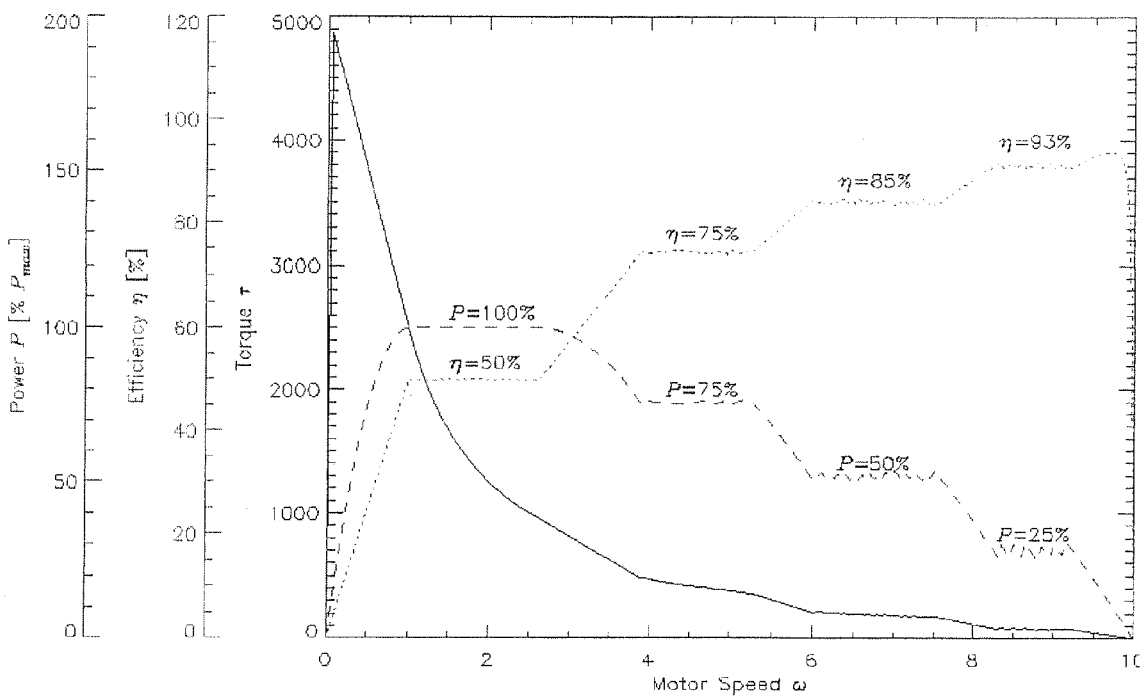

While the efficiency of the motor shown in FIGS. 8A and 8B is only 50%, it is well known that the operating efficiency of conventional motors increases when they work at higher speed and lower power output conditions. Thus, to achieve higher operating efficiency, the motor controller can be commanded to operate at speeds higher than the maximum power speed of each winding configuration. FIGS. 9A and 9B show how the motor efficiency and τ-ω curve change as the motor is commanded to operate at four different power settings. FIGS. 9A and 9B illustrate that the AWS motor characteristic curves are switched from 100% to 75%, 50% and 25% power output subsequently. When the motor is operating at 25% of its rated power output, efficiency higher than 90% can be achieved.

In addition to the constant power mode as described by the constant power condition of M=N, the AWS of the motor can also be configured with a large number of parallel winding units but with only a small number of series-connected winding elements in each of the parallel winding units to operate the motor in a high output torque (or equivalently, high output power) mode. For example, the 16-winding-elements AWS of FIG. 4 can be configured into a winding array with 16 parallel winding units but only with one winding elements in each of the parallel winding units (16×1), such as the winding array shown in FIG. 7. This configuration provides the maximum stall torque allowed for this motor, albeit with reduced efficiency at low operating speed. Thus, it is plausible that this configuration can be used when maximum acceleration is required, or desired, such as the case for high performance racing cars. Another potential application of this mode at low speed is when the vehicles are loaded with extra heavy load, or when the vehicles are required to climb a steep hill at low speed, or when driving in slow, off-road conditions.

In addition to applications at low operating speed, note that the maximum efficiency operating speed of this configuration is approximately equal to that of the 4×4 configuration. However, this configuration provides a much higher output torque and power at the maximum efficiency operating speed than that provided by the 4×4 configuration. Thus, it can be used for rapid acceleration during highway passing at high speed, for example. Or, it can be used in a constant-speed mode to maintain a high operating speed under increased loading conditions, such as driving uphill with steep slope, while maintaining a high operating efficiency. As a specific example, we consider the strategy to provide additional torque to maintain the high speed operation of a motor in a 1×1 configuration with increased external loading. To provide increasingly higher output torque and power at the same optimal operating speed, the number of parallel winding units can be increased while maintaining the number of series-connected winding elements in each of the parallel winding unit, from 1×1, to 2×1, etc., up to the maximum power configuration of 16×1. The same adjustment of output power at the constant operating speed can also be achieved at a decreased optimal operating speed, switching from 1×2, 2×2, 3×2, etc., to 8×2 configuration.

This high-output-torque mode can be realized in many different configurations of the AWS, such as 16×1, 15×1, or 8×2, 6×2, etc, for the 16-winding-elements AWS of FIG. 4. The selection of the optimal configuration obviously depends on the operating speed, the loading condition, and the desired performance characteristics of the motor in real time. The AWS of this invention obviously provides a very flexible motor that can be used in very diverse operating conditions while maintaining a high operating efficiency.

The descriptions and illustrations above demonstrate that the parallel winding system of this invention behaves as a variable inductance and resistance winding for the PM BLDC motor. A PM BLDC motor equipped with such an AWS stator thus has expanded operating torque and speed range with high efficiency, approaching that of an ideal motor. This illustration also clearly demonstrates the differences between this invention and that of Pyntikov and Gladkov. In this inventive design, the winding configurations must follow a clearly defined formula, namely that the number of winding elements in each parallel winding must equal to that of the number of parallel winding energized. This is not the case in PK's design. Also, not all of the winding elements are energized all the time in this invention, while in PK's design, all the windings are energized all the time. Finally, in PK's design, the rated power of the winding configurations is not required to be the same. Thus, it can not deliver a constant maximum allowable power over a broad operating speed range.

When an AWS BLDC motor is not energized, and with its PM rotor driven by an external force, such as water or wind turbines, it becomes a generator. According to Faraday's law of induction, each winding element generates an electromotive force (EMF) proportional to the rotational speed of the rotor, the number of current loops and their cross-sectional area in the winding, and the magnetic field intensity of the PM rotor. That is, $$\epsilon_i = N_i n_0 \phi \beta \omega \qquad (22)$$

if the winding is constructed from $N_i$ of winding elements connected in series. Thus, the voltage constant $K_v = N_i n_0 \phi \beta$ (terminal voltage as function of speed) of the generator can be dynamically adjusted by the AWS. For generators with multiple windings, the electric current produced in each parallel winding will be independent of the number of current loops in the winding, since $$\hat{I}_i = \frac{\varepsilon}{R_i} = \frac{N_i n_0 \phi B}{N_i R_0} \omega = \frac{n_0 \phi B}{R_0} \omega \equiv \hat{I}_0. \qquad (23)$$

If the parallel windings have identical characteristics, then the total current generated by the N-parallel-winding generator at a given speed is the sum of the currents from all the windings, and will be proportional to N, regardless of the characteristics of the parallel windings. That is, $$I = \sum_{i=1}^{N} \hat{I}_0 = N\hat{I}_0. \qquad (24)$$

The variable characteristics of an AWS generator are of particular interest for regenerative braking application in electric vehicles, since it can adjust the charging voltage and current dynamically according to the charging state of the battery. When a battery is substantially discharged, high charging current is preferred for faster charging of the battery. On the other hand, when a battery is close to fully charged, a constant charging voltage close to the battery's rated voltage is preferred. Obviously the AWS generator can also be switched to the constant voltage mode, such that it maintains a constant voltage output close to the rated batteries, independent of the rotor speed. This will prevent overcharging and reduction of the lifetime of batteries. The 16-winding-elements AWS shown in FIG. 4 can also be used for these purposes.

The ability to adjust the characteristics of generators with an AWS is also of practical importance in power generators that depends on uncontrolled variable driving force, such as wind electric power generation. A wind turbine generator with fixed winding topology will not be able to operate when wind speed falls below its designed operating speed. This is because the winding current, which determines the reaction torque, in a fixed winding topology generator depends only on the speed of the generator and cannot be adjusted. In comparison, the winding configuration of a generator equipped with the AWS of this invention can be adjusted in response to the ever-changing wind speed, and can be operated even in low wind speed condition. An AWS generator can be configured to operate at high wind condition with several parallel windings. For operation in low wind speed conditions, the number of parallel windings should be reduced to lower the driving torque (at the same operating speed) of the generators.

The present invention has disclosed an adaptive winding system and its control method for use in electric motors and generators. For motor applications, the AWS dynamically adjust the characteristics of the motors such that the rated power for each configuration is maintained at a constant level. The AWS motors are preferably powered by a constant-voltage power supply. The motor controllers select the operating point of the motors in each configuration in real time in response to the loading conditions and operator requests to deliver the desired power level and efficiency. The motor controllers can employ pulse-width modulation scheme to adjust the actual output power. In ideal situations in which winding elements with identical electrical characteristics can be assumed, the requirement for constant rated power is met by setting the number of winding elements connected in series in each parallel winding Ni equal to the number of active parallel windings N. That is, $$N_i = N.$$

However, it should be understood that small deviation from ideal cases, such as small variations in the cross sectional area of the current loops of the winding elements, or small differences in the length and the resistance of the winding elements can be compensated for by small deviation from the $N_i = N$ rule in order to maintain approximately constant rated power for all the configurations.

Adaptive-winding-system-equipped motors and generators will be able to operate over a large torque and speed range with high efficiency. The adaptive winding system disclosed in this invention can be employed in the stationary interacting magnetic component of any AC and DC machine to optimize their performance for their designed tasks. Simpler design requiring less number of switches can also be implemented on the rotating armature of the electric machines using slip rings. Additionally, the winding elements can be distributed over a several magnetic poles. Other method to manipulate the input power into the system, such as changing the number of batteries connected in series to provide the constant voltage power to change $V_0$ can be implement to enhance the performance the AWS-equipped motors. More complicated AWS can be designed according to this invention.

While the above is a full description of the specific embodiments, various modifications, alternative constructions and equivalents may be used. Therefore, the above description and illustrations should not be taken as limiting the scope of the present invention, which is defined by the appended claims.

What is claimed is:

1. An electric motor with an adaptive winding network comprising:
   a plurality of winding elements electrically connected to form a winding array, the winding array having one or more parallel winding units each having one or more identical series-connected winding elements energizable by a power source; wherein the winding array is configurable to form a winding array with a small number of parallel winding units with a small number of winding elements connected in series in each of the parallel winding units to allow the electric motor to work at high speed and low output torque condition with high efficiency;

the winding array is further configurable with a large number of parallel winding units and with a large and identical number of winding elements connected in series in each of the parallel winding units to allow the electric motor to work at low speed and high output torque condition with high efficiency; and the winding array is further configurable with a large number of parallel winding units with a small number of series winding elements in each of the parallel winding units to allow the electric motor to work at very low speed and very high output torque condition with high efficiency.

2. A method of adaptive winding control of an electric motor for constant rated power output operation, the method comprising:

configuring the winding array with a small number of parallel winding units with a small and identical number of winding elements connected in series in each parallel winding units to allow the electric machine to work at high speed and low output torque condition with high efficiency;

configuring the winding array with a larger number of parallel winding units with a large and identical number of winding elements connected in series in each of the parallel winding units to allow the electric motor to work at lower speed and higher output torque condition with high efficiency, while maintaining the rated power of the motor equal to that of the original winding configurations; wherein the number N of winding elements $N_0$ in each parallel winding unit and the number of parallel winding units M energized satisfying the condition N=M; and configuring the winding array with a smaller number of parallel winding units with a smaller and identical number of winding elements connected in series in each of the parallel winding units to allow the electric motor to work at higher speed and lower output torque condition with high efficiency, while maintaining the rated power of the motor equal to that of the original winding configurations; wherein the number N of winding elements $N_0$ in each parallel winding unit and the number of parallel winding units M energized satisfying the condition N=M.

3. The method of claim 2 further comprising:

configuring the adaptive winding network to form a winding array with a large number of parallel winding units and a small number of winding elements connected in series in each parallel winding unit to provide large output torque at low speed to facilitate the rapid acceleration of the load within the full operating speed range of the motor, or to operate the motor at high load conditions at high speed with high efficiency.

4. A method of adaptive winding control of the electric generator comprising:

configuring the winding array to form a winding array with a small number of parallel winding units and with a small number of series-connect winding elements in each of the parallel winding units to allow the electric generator to work at high speed and low input torque condition with high efficiency;

configuring the winding array with a small number of parallel winding units and with a large number of winding elements connected in series in each of the parallel winding units to allow the electric generator to work at high speed and high input torque condition with high efficiency;

configuring the winding array with a large number of parallel winding units and with a large number of winding elements connected in series in each of the parallel winding units to allow the electric generator to work at low speed and high input torque condition with high efficiency; and configuring the winding array with a very large number of parallel winding units and with a small number of winding elements connected in series in each of the parallel winding units to allow the electric generator to work at very low speed and very high input torque condition with high efficiency.

5. A method of adaptive winding control of an electric generator comprising:

configuring the winding array to form a winding array with a small number of parallel winding units and with a small number of series-connect winding elements in each of the parallel winding units to allow the electric generator to provide a low current and low voltage output;

configuring the winding array with a small number of parallel winding units and with a large number of winding elements connected in series in each of the parallel winding units to allow the electric generator to provide a low current and high voltage output;

configuring the winding array with a large number of parallel winding units and with a large number of winding elements connected in series in each of the parallel winding units to allow the electric generator to provide a high current and high voltage output; and configuring the winding array with a very large number of parallel winding units and with a small number of winding elements connected in series in each of the parallel winding units to allow the electric generator to provide a very high current but low voltage output.

* * * * *